(12) United States Patent
Chen et al.

(10) Patent No.: US 10,187,186 B2
(45) Date of Patent: Jan. 22, 2019

(54) UPLINK GRANT MANAGEMENT FOR LTE IN UNLICENSED SPECTRUM

(71) Applicant: QUALCOMM Incorporated, San Diego, CA (US)

(72) Inventors: Wanshi Chen, San Diego, CA (US); Peter Gaal, San Diego, CA (US); Tao Luo, San Diego, CA (US); Aleksandar Damnjanovic, Del Mar, CA (US); Yongbin Wei, La Jolla, CA (US); Durga Prasad Malladi, San Diego, CA (US); Hao Xu, San Diego, CA (US); Srinivas Yerramalli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 379 days.

(21) Appl. No.: 14/869,779

(22) Filed: Sep. 29, 2015

(65) Prior Publication Data

US 2016/0095134 A1    Mar. 31, 2016

Related U.S. Application Data

(60) Provisional application No. 62/057,954, filed on Sep. 30, 2014.

(51) Int. Cl.
*H04W 72/14* (2009.01)
*H04L 1/18* (2006.01)
(Continued)

(52) U.S. Cl.
CPC .......... *H04L 1/1861* (2013.01); *H04W 72/14* (2013.01); *H04W 16/14* (2013.01); *H04W 74/0808* (2013.01)

(58) Field of Classification Search
CPC ......... H04W 72/1268; H04W 72/1278; H04W 72/1289; H04W 72/14; H04W 16/14; H04L 1/1861
See application file for complete search history.

(56) References Cited

U.S. PATENT DOCUMENTS

2012/0076104 A1   3/2012  Chun et al.
2013/0242824 A1*  9/2013  Lee ................. H04L 1/1819
                                                    370/281

FOREIGN PATENT DOCUMENTS

EP    2741542 A1    6/2014
EP    2779737 A1    9/2014
(Continued)

OTHER PUBLICATIONS

Partial International Search Report—PCT/US2015/053262—ISA/EPO—Dec. 14, 2015. 7 Total Pages.
(Continued)

*Primary Examiner* — Kent K Krueger
(74) *Attorney, Agent, or Firm* — Arent Fox, LLP

(57) ABSTRACT

Systems and methods for uplink transmission scheduling are disclosed. A wireless device may monitor at least two downlink sub-frames for scheduling grants. The wireless device may receive a first uplink scheduling grant in one of the at least two downlink sub-frames for at least a first uplink sub-frame and receive a second uplink scheduling grant in another of the at least two downlink sub-frames for at least the first uplink sub-frame. The wireless device may perform an uplink transmission in the first uplink sub-frame based on one or both of the first uplink scheduling grant and the second uplink scheduling grant. For the uplink transmission, the wireless device may select a most recent uplink scheduling grant or select an uplink scheduling grant received in
(Continued)

a downlink sub-frame at least a minimum number of sub-frames before the first uplink sub-frame.

30 Claims, 9 Drawing Sheets

(51) Int. Cl.
    *H04W 16/14*    (2009.01)
    *H04W 74/08*    (2009.01)

(56) References Cited

FOREIGN PATENT DOCUMENTS

EP           2940956 A1    11/2015
WO    WO-2013/167748 A1    11/2013
WO    WO-2014/117335 A1     8/2014

OTHER PUBLICATIONS

International Search Report and Written Opinion—PCT/US2015/053262—ISA/EPO—Apr. 4, 2016. 8 Total Pages.

\* cited by examiner

UPLINK GRANT MANAGEMENT FOR LTE IN UNLICENSED SPECTRUM

CROSS-REFERENCE TO RELATED CASES

The present Application for Patent claims priority to U.S. Provisional Application No. 62/057,954, entitled "UPLINK GRANT MANAGEMENT FOR LTE IN UNLICENSED SPECTRUM" filed Sep. 30, 2014, and assigned to the assignee hereof and hereby expressly incorporated by reference herein.

BACKGROUND

Aspects of this disclosure relate generally to telecommunications, and more particularly to uplink scheduling.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A long-term evolution (LTE) wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

Operation of wireless devices in certain portions of a shared or unlicensed spectrum may experience interference from another radio access technology (RAT) using the spectrum. For example, both LTE and Wi-Fi may operate in an unlicensed 5 GHz band. Over-the-air interference detection is employed in some wireless communication networks in an attempt to mitigate such interference. For example, a device may periodically monitor (e.g., sniff) for energy in the RF band used by the device. Upon detection of any kind of energy, the device may back-off the RF band for a period of time. Such process may be referred to as clear channel assessment (CCA).

In practice, however, there may be problems with such a back-off or "listen-before-talk" (LBT) approach, at least when applied to radio technologies using a frame structure and uplink grants. For example, for an LTE system operating in an unlicensed or shared band, a UE may need to consider both uplink grants scheduled by the eNodeB and LBT or CCA requirements. In view of the foregoing, it may be understood that there may be significant problems and shortcomings associated with operation of wireless devices in shared and unlicensed spectrum.

SUMMARY

Various aspects are now described with reference to the drawings. In the following description, for purposes of explanation, numerous specific details are set forth in order to provide a thorough understanding of one or more aspects. It may be evident, however, that such aspects may be practiced without these specific details. The following presents a simplified summary of one or more aspects in order to provide a basic understanding of such aspects.

Systems and methods for uplink transmission scheduling are disclosed. A wireless device may monitor at least two downlink sub-frames for scheduling grants. The wireless device may receive a first uplink scheduling grant in one of the at least two downlink sub-frames for at least a first uplink sub-frame and receive a second uplink scheduling grant in another of the at least two downlink sub-frames for at least the first uplink sub-frame. The wireless device may select one or both of the first uplink scheduling grant and the second uplink scheduling grant for an uplink transmission in the first uplink sub-frame. A base station may transmit a first uplink scheduling grant for at least a first uplink sub-frame and a second uplink scheduling grant for at least the first uplink sub-frame. The base station may receive, in the first uplink sub-frame, an uplink transmission. The base station may process the uplink transmission according to at least one of the first uplink scheduling grant or the second uplink scheduling grant.

In an aspect, the disclosure provides method for transmitting scheduled uplink wireless transmissions. The method may include monitoring at least two downlink sub-frames for scheduling grants. The method may further include receiving a first uplink scheduling grant in one of the at least two downlink sub-frames for at least a first uplink sub-frame and receiving a second uplink scheduling grant in another of the at least two downlink sub-frames for at least the first uplink sub-frame. The method may also include performing an uplink transmission in the first uplink sub-frame based on one or both of the first uplink scheduling grant and the second uplink scheduling grant.

In another aspect, the disclosure provides an apparatus for transmitting scheduled uplink wireless transmissions. The apparatus may include means for monitoring at least two downlink sub-frames for scheduling grants. The apparatus may further include means for receiving a first uplink scheduling grant in one of the at least two downlink sub-frames for at least a first uplink sub-frame and means for receiving a second uplink scheduling grant in one of the at least two downlink sub-frames for at least the first uplink sub-frame. The apparatus may also include means for performing an uplink transmission in the first uplink sub-frame based on one or both of the first uplink scheduling grant and the second uplink scheduling grant.

In another aspect, the disclosure provides another apparatus for transmitting scheduled uplink wireless transmissions. The apparatus may include a transceiver configured to receive scheduling grants in one or more downlink sub-frames and transmit data in one or more uplink sub-frames. The apparatus may further include a memory and a processor communicatively coupled to the transceiver and the memory. The processor and the memory may be configured to monitor, via the transceiver, at least two of the one or more downlink sub-frames for the scheduling grants. The processor and the memory may also be configured to receive a first uplink scheduling grant in one of the at least two downlink sub-frames for at least a first uplink sub-frame of the one or more uplink sub-frames. The processor and the memory may additionally be configured to receive a second uplink scheduling grant in another of the at least two downlink sub-frames for at least the first uplink sub-frame. The processor and the memory may further be configured to perform an uplink transmission in the first uplink sub-frame based on one or both of the first uplink scheduling grant and the second uplink scheduling grant.

In another aspect, the disclosure provides a computer-readable medium storing computer executable code for transmitting scheduled uplink wireless transmissions. The computer-readable medium may include code for monitoring at least two downlink sub-frames for scheduling grants. The computer-readable medium may further include code for receiving a first uplink scheduling grant in one of the at least two downlink sub-frames for at least a first uplink sub-frame. The computer-readable medium may also include code for receiving a second uplink scheduling grant in another of the at least two downlink sub-frames for at least the first uplink sub-frame. The computer-readable medium may also include code for performing an uplink transmission in the first uplink sub-frame based on one or both of the first uplink scheduling grant and the second uplink scheduling grant. The computer readable medium may be a non-transitory computer readable medium.

In another aspect, the disclosure provides a method for scheduling uplink wireless transmissions. The method may include transmitting, to a device, a first uplink scheduling grant for at least a first uplink sub-frame and transmitting, to the device, a second uplink scheduling grant for at least the first uplink sub-frame. The method may further include receiving, in the first uplink sub-frame, an uplink transmission from the device. The method may also include processing the uplink transmission according to one of the first uplink scheduling grant and the second uplink scheduling grant.

In another aspect, the disclosure provides an apparatus for scheduling uplink wireless transmissions. The apparatus may include means for transmitting, to a device, a first uplink scheduling grant for at least a first uplink sub-frame and means for transmitting, to the device, a second uplink scheduling grant for at least the first uplink sub-frame. The apparatus may also include means for receiving, in the first uplink sub-frame, an uplink transmission from the device. The apparatus may further include means for processing the uplink transmission according to one of the first uplink scheduling grant and the second uplink scheduling grant.

In another aspect, the disclosure provides another apparatus for scheduling uplink wireless transmissions. The apparatus may include a transmitting component configured to transmit, to a device, a first uplink scheduling grant for at least a first uplink sub-frame, and transmit to the device, a second uplink scheduling grant for at least the first uplink sub-frame. The apparatus may also include a receiving component configured to receive, in the first uplink sub-frame, an uplink transmission from the device. The apparatus may further include a decoding component configured to process the uplink transmission according to one of the first uplink scheduling grant and the second uplink scheduling grant.

In another aspect, the disclosure provides a computer-readable medium storing computer executable instructions for scheduling uplink wireless transmissions. The computer-readable medium may include code for transmitting, to a device, a first uplink scheduling grant for at least a first uplink sub-frame and code for transmitting, to the device, a second uplink scheduling grant for at least the first uplink sub-frame. The computer-readable medium may further include code for receiving, in the first uplink sub-frame, an uplink transmission from the device. The computer-readable medium may also include code for processing the uplink transmission according to one of the first uplink scheduling grant and the second uplink scheduling grant. The computer readable medium may be a non-transitory computer readable medium.

In another aspect, the disclosure provides a method for performing wireless transmissions. The method may include identifying a frame structure, where the frame structure comprises at least two or more sub-frames for a same transmission direction. The method may also include performing a first clear channel assessment before transmitting in a first set of sub-frames of the at least two or more sub-frames. The method may further include transmitting in the first set of sub-frames based on the first clear channel assessment. The method may also include determining whether to perform a second clear channel assessment before transmitting in a second set of sub-frames of the at least two or more sub-frames, where the second set of sub-frames are after the first set of sub-frames in the frame. The method may also include transmitting in the second set of sub-frames based on the second channel assessment. Additionally, the disclosure provides an apparatus for performing the method and a computer-readable medium storing executable code for performing the method.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
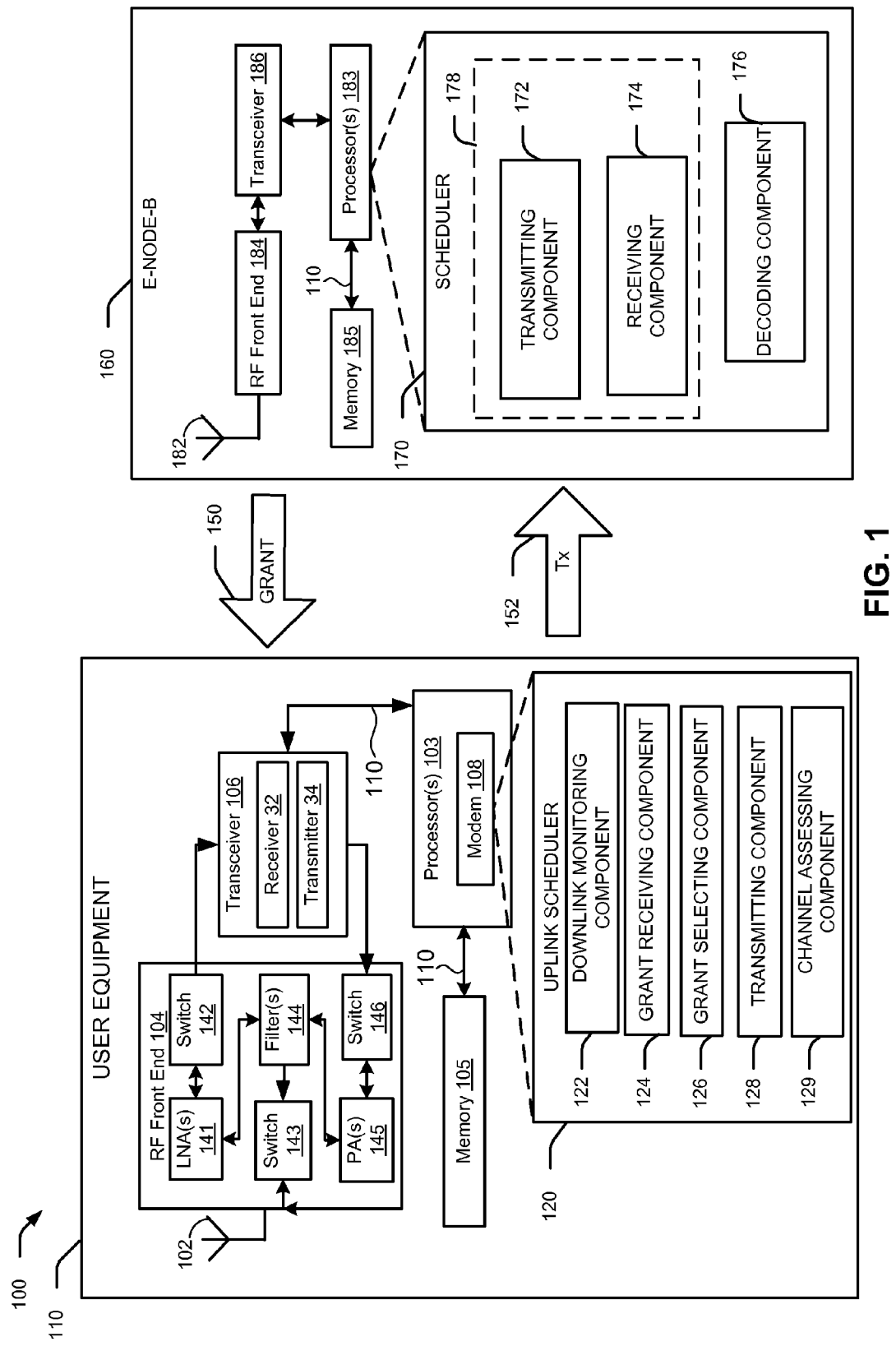
FIG. 1 is a simplified block diagram of several sample aspects of a communication system.

The disclosure relates in some aspects to scheduling uplink transmissions using grants, in particular, in unlicensed spectrum. A communications system may use time division duplexing (TDD) to allow both downlink and uplink transmissions over the same portion of spectrum (e.g., channel, carrier, or frequency band). For example, transmissions on a carrier may be organized in a frame structure. For example, an LTE frame structure may be used, and the terms radio frame, LTE frame, and frame may be used interchangeably. In an aspect, a frame having a TDD frame structure may include downlink sub-frames, uplink sub-frames, and special sub-frames. The eNodeB may transmit a scheduling grant to a UE during a downlink sub-frame. The scheduling grant may assign resource elements (RE) a modulation and coding scheme (MCS), and/or a waveform, to the UE to use for an uplink transmission during one or more sub-frames. In an aspect, a scheduling system for LTE in unlicensed spectrum may need to balance signaling overhead and flexibility for changing conditions.

In an aspect, the eNodeB may transmit one or more additional scheduling grants during subsequent downlink sub-frames for one or more uplink sub-frames. Further, in some aspects, a second eNodeB, such as a secondary eNodeB operating on a second carrier, may also provide additional uplink scheduling grants. Accordingly, the UE may receive two or more scheduling grants for the same uplink sub-frame. In an aspect, the UE may select one of the uplink scheduling grants for an uplink transmission during the uplink sub-frame. For example, but not limited hereto, the UE may select the most recently received uplink scheduling grant. The UE may also include an indication of the selected scheduling grant in an uplink transmission.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates several nodes of a sample communication system 100 (e.g., a portion of a communication network). For illustration purposes, various aspects of the disclosure will be described in the context of one or more user equipment (UE) 110 and evolved NodeB (eNodeB) 160. The user equipment (UE) 110 may be in communication with the eNodeB 160. The eNode B 160 may schedule uplink transmissions 152 for the UE 110. For example, the eNodeB 160 may transmit uplink scheduling grants 150 indicating at least resources and a modulation and coding scheme for the UE 110 to use for an uplink transmission in an uplink sub-frame. In an aspect, the term "grant" and "uplink scheduling grant" may be used interchangeably to refer to an uplink scheduling grant 150. Further, the term "received grant" may be used to refer to an uplink scheduling grant 150 that has been received by a UE 110. It should be appreciated, however, that the teachings herein may be applicable to other types of apparatuses or other similar apparatuses that are referenced using other terminology. For example, in various implementations, eNodeBs 160 may be referred to or implemented as access points, base stations, NodeBs, Home NodeBs, Home eNodeBs, small cells, macro cells, femto cells, and so on, while UEs 110 may be referred to or implemented as access terminals, mobile stations, and so on.

For convenience, the use, operation, extension, and/or adaptation of LTE and/or LTE Advanced for applications in an unlicensed or shared radio frequency (RF) band may be referred to herein as "LTE/LTE Advanced in unlicensed spectrum," "adapting LTE/LTE Advanced in unlicensed spectrum," "extending LTE/LTE Advanced to unlicensed spectrum," and "LTE/LTE Advanced communications over unlicensed spectrum" etc. Moreover, a network or device that provides, adapts, or extends LTE/LTE Advanced in unlicensed spectrum may refer to a network or device that is configured to operate in a contention-based radio frequency band or spectrum.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental Down Link (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed) or TDD downlink and uplink, and each SCell may provide additional downlink capacity as desired.

In general, LTE utilizes orthogonal frequency division multiplexing (OFDM) on the downlink and single-carrier frequency division multiplexing (SC-FDM) on the uplink. In an aspect, either OFDM or SC-FDM may be utilized on the uplink on a per sub-frame basis. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for system bandwidth of 1.25, 2.5, 5, 10 or 20 MHz, respectively. LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

According to the present aspects, the UE 110 may include one or more processors 103 that may operate in combination with an uplink scheduler 120 for managing uplink transmissions based on scheduling grants received by the UE 110. The uplink scheduler 120 may include hardware, firmware, and/or software code executable by a processor 103 for scheduling an uplink transmission during a time slot (e.g., an uplink sub-frame) based on multiple scheduling grants, the code comprising instructions and being stored in a memory (e.g., computer-readable medium). The uplink scheduler 120 may include a downlink monitoring component 122 for monitoring at least two downlink sub-frames for scheduling grants, a grant receiving component 124 for receiving at least two uplink scheduling grants in the at least two downlink sub-frames for at least a first uplink sub-frame, a grant selecting component 126 for selecting one of the uplink scheduling grants for an uplink transmission in the first uplink sub-frame, and a transmitting component 128 for transmitting the uplink transmission. In an aspect, the term "component" as used herein may be one of the parts that make up a system, may be hardware or software, and may be divided into other components.

The receiver 32 may include hardware, firmware, and/or software code executable by a processor (e.g. a processor of transceiver 106) for receiving data, the code comprising instructions and being stored in a memory (e.g., computer-readable medium). The receiver 32 may be, for example, a radio frequency (RF) receiver. In an aspect, the receiver 32 may receive signals transmitted by the eNodeB 160. The receiver 32 may obtain measurements of the signals. For example, the receiver 32 may determine Ec/Io, SNR, etc.

The transmitter 34 may include hardware, firmware, and/or software code executable by a processor (e.g. a processor of transceiver 106) for transmitting data, the code comprising instructions and being stored in a memory (e.g., computer-readable medium). The transmitter 34 may be, for example, a RF transmitter.

In an aspect, the one or more processors 103 can include one or more modem processors that provide a modem 108. The various functions related to uplink scheduling and transmission may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in uplink scheduler 120, including the downlink monitoring component 122 for monitoring at least two downlink sub-frames for scheduling grants, a grant receiving component 124 for receiving at least two uplink scheduling grants for at least a first uplink sub-frame, a grant selecting component 126 for selecting one of the uplink scheduling grants for an uplink transmission in the first uplink sub-frame, and a transmitting component 128 for transmitting the uplink transmission.

The downlink monitoring component 122 may include hardware, firmware, and/or software code executable by a processor (e.g., processor(s) 103) for monitoring one or more downlink sub-frames for uplink scheduling grants 150, the code comprising instructions and being stored in a memory (e.g., memory 105 or another computer-readable medium). For example, the downlink monitoring component 122 may include or control an antenna 102, RF front end 104, and/or receiver 32. The downlink monitoring component 122 may be configured to monitor a set of downlink sub-frames in one or more frames that may carry a grant 150. In an aspect, downlink sub-frames that may carry a grant 150 may be determined based on a frame structure or uplink-downlink configuration. In an aspect, a frame structure may define properties of the frame including a length of the frame, a number of sub-frames, and a length of sub-frames. An uplink-downlink configuration may indicate which of the sub-frames in the frame is designated as an uplink sub-frame (U), a downlink sub-frame (D), or a special sub-frame (S'). For example, the frame structure may indicate that there are multiple downlink sub-frames in a frame and that the first downlink sub-frame and the last downlink sub-frame of the frame may be designated for carrying grants 150. The downlink monitoring component 122 may monitor multiple frames to identify the appropriate downlink sub-frames. In another aspect, a special sub-frame may carry a grant 150. For example, a downlink pilot time slot (DwPTS) portion of the special sub-frame may carry a grant 150. The downlink monitoring component 122 may receive signals, which may include the uplink scheduling grants 150 during the designated downlink sub-frames for carrying the grants 150. The downlink monitoring component 122 may power down during other sub-frames not designated for carrying a grant 150 if no downlink traffic is scheduled for the UE 110.

The grant receiving component 124 may include hardware, firmware, and/or software code executable by a processor (e.g., processor(s) 103) for receiving uplink scheduling grants in the downlink sub-frames, the code comprising instructions and being stored in a memory (e.g., memory 105 or another computer-readable medium). For example, the grant receiving component 124 may include or control the receiver 32 to decode a grant 150. The grant receiving component 124 may determine a format of the grant 150. In an aspect, the grant receiving component 124 may determine the format of the grant 150 based on a frame structure. For example, the grant receiving component 124 may determine the length of the grant 150 or the resource elements carrying the uplink scheduling grant 150 based on the frame structure. The grant receiving component 124 may decode the received uplink scheduling grant 150 according to the determined format. The grant receiving component 124 may extract information elements from the uplink scheduling grant 150 such as uplink sub-frame numbers, HARQ process identifiers, modulation and coding schemes, waveforms, or any other information the uplink scheduling grant provides for an uplink transmission. The grant receiving component 124 may receive multiple uplink scheduling grants for a single uplink sub-frame.

The grant selecting component 126 may include hardware, firmware, and/or software code executable by a processor (e.g., processor(s) 103) for selecting an uplink scheduling grant to use for an uplink transmission during an uplink sub-frame, the code comprising instructions and being stored in a memory (e.g., memory 105 or another computer-readable medium). If only one grant 150 is received, the grant selecting component 126 may select the one available grant. If multiple uplink scheduling grants are received, the grant selecting component 126 may select one or more uplink scheduling grants according to configured priority rules. For example, a priority rule may indicate that the most recently received grant 150 should be used. Further priority rules may indicate a minimum time (e.g., 4 sub-frames) between receipt of an uplink scheduling grant 150 and an uplink sub-frame. In another aspect, the priority rules may configure the grant selecting component 126 to select an uplink scheduling grant 150 allowing a minimum size or a maximum size for a transmission. Examples of priority rules are described in further detail below regarding FIGS. 2-5. In an aspect, if the grant selecting component 126 determines that more than one grant is applicable, the grant selecting component 126 may combine the grants 150. For example, the grant selecting component 126 may combine power control commands from two or more grants. The grant selecting component 126 may also combine resource allocations from two or more grants. For example, the grant selecting component 126 may determine that the UE 110 may transmit on all of the resources indicated in both a first grant and a second grant.

The transmitting component 128 may include hardware, firmware, and/or software code executable by a processor (e.g., processor(s) 103) for performing an uplink transmission in the first uplink sub-frame based on one or both of the first uplink scheduling grant and the second uplink scheduling grant, the code comprising instructions and being stored in a memory (e.g., memory 105 or another computer-readable medium). For example, the transmitting component 128 may include or control a transmitter 34 for performing the uplink transmission 152. The transmitting component 128 may determine data to transmit based on one or both of the first uplink scheduling grant and the second uplink scheduling grant selected for the uplink transmission. The transmitting component 128 may use the resources assigned by the one or more selected grants to modulate an RF carrier to transmit the data. In an aspect, the transmitting component 128 may be configured to provide signaling related to the uplink transmission. For example, the transmitting component 128 may provide an indication of one or more uplink scheduling grants used for the transmission. For example, the indication may be a bit flag indicating whether the selected grant is a first received grant or a second received grant. As another example, a bit-map may be used to indicate whether each received grant was used for the uplink transmission.

The channel assessing component 129 may include hardware, firmware, and/or software code executable by a processor (e.g., processor(s) 103) configured to determine whether a channel is available for a transmission, the code comprising instructions and being stored in a memory (e.g., memory 105 or another computer-readable medium). For example, channel assessing component 129 may include or control a receiver 32 to measure received signal energy in a channel. Channel assessing component 129 may determine that a channel or medium is clear when the signal energy falls below a threshold value. In an aspect, channel assessing component 129 may determine whether a channel is available according to regulations or a standard. For example, EN 301.893 may define LBT procedures. IEEE 802.11 and 802.15 standards may define clear channel assessment (CCA) procedures. Generally, the CCA procedures may involve monitoring a channel for a CCA duration or time slot, for example 20 microseconds (p). If the channel is clear during the time slot (e.g., the communications medium is available or accessible), the device may begin using or accessing the channel. If the channel is not clear, the device may determine a random backoff counter for the channel. Each time the device detects a clear time slot, the random backoff counter is decremented. In an aspect, the UE 110 may perform CCA or an extended CCA (ECCA) prior to an uplink transmission to determine that the channel or medium is clear for the uplink transmission. The channel assessing component 129 may perform a CCA procedure prior to a first uplink sub-frame (e.g. during a special sub-frame). The UE 110 may continue to transmit in subsequent sub-frames. If the UE 110 is not scheduled to transmit in a sub-frame, the channel assessing component 129 may perform CCA again before the next scheduled uplink sub-frame.

Moreover, in an aspect, UE 110 may include RF front end 104 and transceiver 106 for receiving and transmitting radio transmissions, for example, grant 150 transmitted by the eNodeB 160. For example, transceiver 106 may receive a signal that includes a physical downlink control channel (PDCCH) from the eNodeB 160. The transceiver 106 may demodulate the received signal to obtain the grant 150, which may then be considered a received grant. Further, the transceiver 106 may transmit the uplink transmission 152.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 110 can communicate with, for example, eNodeB 160. In an aspect, for example, modem 108 can configure transceiver 106 to operate at a specified frequency and power level based on the UE configuration of the UE 110 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 110 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

UE 110 may further include a memory 105, such as for storing data used herein and/or local versions of applications or uplink scheduler 120 and/or one or more of its subcomponents being executed by processor 103. Memory 105 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 105 may be a computer-readable storage medium that stores one or more computer-executable codes defining uplink scheduler 120 and/or one or more of its subcomponents, and/or data associated therewith, when UE 110 is operating processor 103 to execute uplink scheduler 120 and/or one or more of its subcomponents. In another aspect, for example, memory 105 may be a non-transitory computer-readable storage medium.

The eNodeB 160 may include a scheduler 170 having hardware, firmware, and/or software code executable by a processor (e.g. processor(s) 183) for scheduling uplink transmissions from one or more UEs 110, the code comprising instructions and being stored in a memory (e.g., memory 185 or another computer-readable medium). In an aspect, the scheduler 170 may be implemented by a processor 183 and memory 185. The scheduler 170 may communicate via a transceiver 186 and RF front end 184, which may be similar to the transceiver 106 and RF front end 104, respectively. The scheduler 170 may determine when each UE 110 is allowed to transmit in the uplink. The scheduler 170 may allocate resources to the UE 110 to use for the uplink transmission 152. The scheduler 170 may generate uplink scheduling grants 150 to indicate a scheduling of uplink transmission to the UE 110. In an aspect, the scheduler 170 may update a scheduled uplink grant for a UE 110. For example, after the eNodeB 160 has transmitted a first grant 150 for an uplink sub-frame, the scheduler 170 may receive additional information such as updated channel quality information, decoding status for a HARQ process, additional scheduling information, or other information that may affect uplink transmissions. The scheduler 170 may update the scheduled uplink transmissions based on the additional information and send a new or subsequent grant 150 for the same uplink sub-frame. In an aspect, the scheduler 170 may generate joint grants which allocate resources for multiple uplink sub-frames and individual grants which allocate resources for single sub-frames. The scheduler 170 may include a transmitting component 172, a receiving component 174, and a decoding component 176

The transmitting component 172 may include hardware, firmware, and/or software code executable by a processor for transmitting one or more uplink scheduling grants 150 for at least a first uplink sub-frame, the code comprising instructions and being stored in a memory (e.g., computer-readable medium). For example, the transmitting component 172 may include a transmit processor (e.g., TX MIMO Processor 1120 (FIG. 11)) and a transmitter (e.g., transmitter 1122 (FIG. 11). The transmitting component 172 may format the uplink scheduling grant 150 based on a radio frame structure. In an aspect, multiple radio frame structures may use the same format for grants to minimize complexity of the format and reduce blind detection of the grants. For example, the format may define information elements for each uplink sub-frame in the radio frame structure. In an aspect, the format may be based on a worst-case scenario where the format is long enough for each sub-frame in a valid radio frame structure having the most uplink sub-frames. In another aspect, a small number of formats may be used for different sets of radio frame structures. For example, one format may be used for radio frames having three of fewer uplink sub-frames and a second format may be used for radio frames having more uplink sub-frames.

The receiving component 174 may include hardware, firmware, and/or software code executable by a processor (e.g., processor(s) 183) for receiving, in an uplink sub-frame, an uplink transmission from the UE 110, the code comprising instructions and being stored in a memory (e.g., memory 185 or another computer-readable medium). For example, the receiving component 174 may include or control an antenna (e.g., antenna 182), and a receiver. In an aspect, the transmitting component 172 and the receiving component 174 may share a transceiver (e.g., transceiver 186) and/or receive/transmit chain components (e.g., an RF front end 184 and antenna 182).

The decoding component 176 may include hardware, firmware, and/or software code executable by a processor for decoding a received transmission, the code comprising instructions and being stored in a memory (e.g., computer-readable medium). For example, the decoding component 176 may include a receive processor and/or a modem. In an aspect, the decoding component 176 may decode a received transmission based on a transmitted uplink scheduling grant. The decoding component 176 may use the transmitted uplink scheduling grant to determine the resources, MCS, waveform, etc. used by the UE 110 for the uplink transmission 152. In an aspect, the uplink transmission 152 may include an indication of an uplink scheduling grant used by the UE 110. For example, a one bit flag may be punctured in one or more resource elements to indicate a grant. As another example, a different demodulation reference signal (DM-RS) cyclic shift may indicate an uplink scheduling grant used for the uplink transmission. In an aspect, the decoding component 176 may also be capable of blind detection to determine an uplink scheduling grant used by the UE 110.

Figure 2:
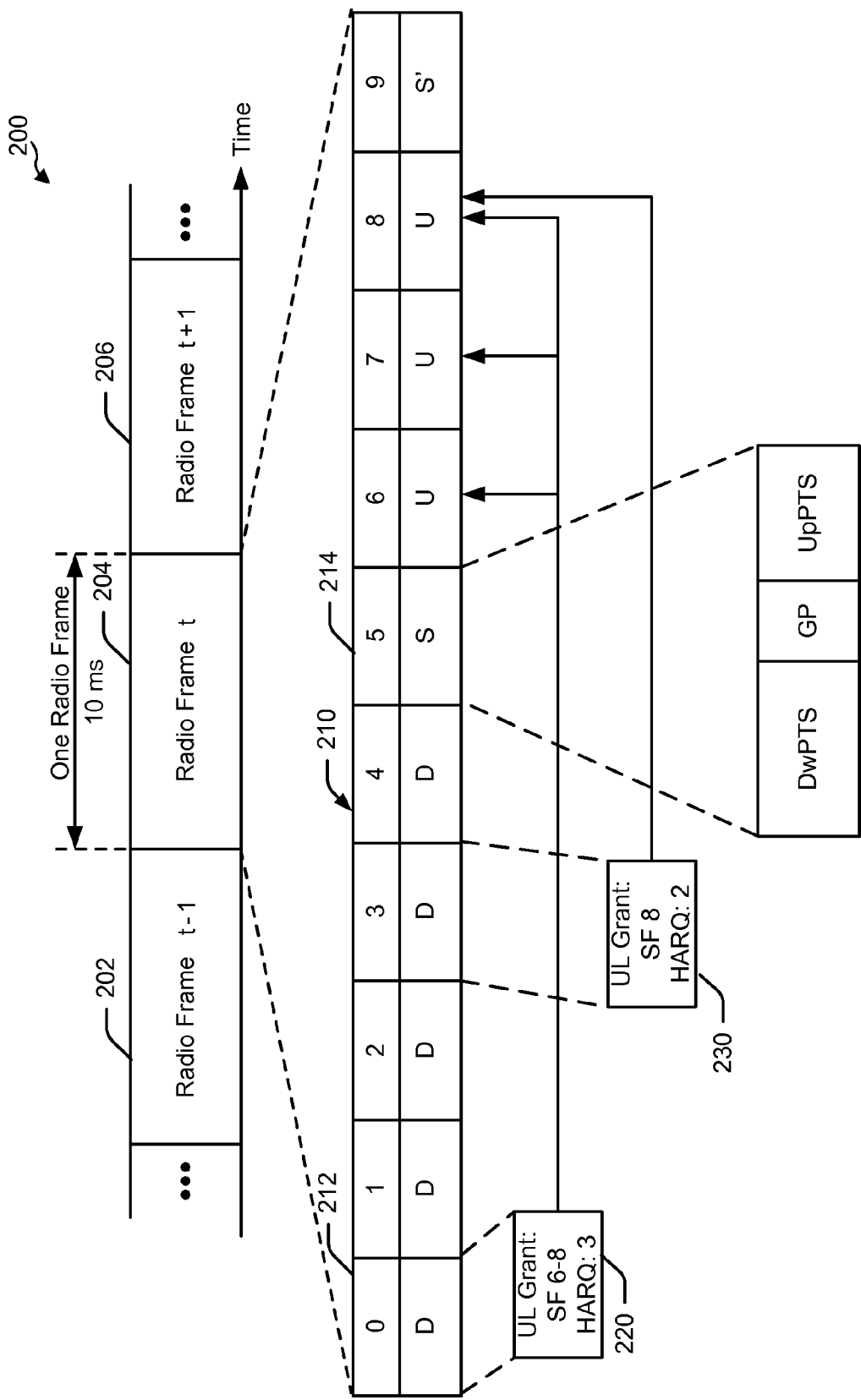
FIG. 2 illustrates an example frame structure for time division duplexing.

FIG. 2 is a block diagram conceptually illustrating an example of a frame structure in a telecommunications system in accordance with an aspect of the present disclosure. The transmission timeline for the downlink may be partitioned into units of radio frames 202, 204, 206. Each radio frame 202, 204, 206 may have a predetermined duration (e.g., 10 milliseconds (ms), 4 ms, or 2 ms) and may be partitioned into, e.g., 10 sub-frames 210 with indices of 0 through 9. Each sub-frame 210 may be designated as one of a downlink sub-frame (D), uplink sub-frame (U), or special sub-frame (S). In an aspect, the first sub-frame 212, with index 0, may be a downlink sub-frame. A special sub-frame 214, for example with index 5, may separate downlink sub-frames from uplink sub-frames. The configuration of downlink, special, and uplink sub-frames may change each radio frame 202, 204, 206. For example, as illustrated, the indices 0-4 are downlink sub-frames, index 5 is a special sub-frame indicating a change of direction, indices 6-8 are uplink sub-frames, and index 9 is a special sub-frame indicating the end of the frame. In another example, the index 0 may be the only downlink sub-frame, index 1 may be a special sub-frame, and indices 3-8 may be uplink sub-frames. It should be understood that other combinations of downlink, special, and uplink sub-frames may define a frame structure. In an aspect, a communication system 100 may define a set of valid frame structures and provide identifiers for each valid frame structure that may be used for signaling the frame structure in use.

The special sub-frame 214 may include a downlink pilot transmission slot (DwPTS), a guard period (GP), and an uplink pilot transmission slot (UpPTS). The DwPTS may carry pilot signals as well as other information about the eNodeB 160 (FIG. 1). The UpPTS may carry an uplink pilot signal as well as other signaling information, such as, for example, selected uplink scheduling grants. In an aspect, the channel assessing component 129 may determine whether an uplink channel or carrier is available during the special sub-frame 214. If the channel or carrier is clear, the UE 110 may transmit in each continuous subsequent uplink sub-frame, for example, sub-frames with indices 6, 7, and 8. If, however, the UE 110 does not have an uplink scheduling grant for a sub-frame such as index 7, the channel assessing component 129 may need to perform CCA again during the sub-frame with no uplink transmission. In an aspect, if the CCA process cannot be completed, for example because another device is using the channel (e.g., the UE 110 detects energy in the channel from another device), the UE 110 may be unable to transmit the scheduled uplink transmission.

As discussed above, the scheduler 170 may transmit the uplink scheduling grant 150 to the UE 110, and the uplink scheduler 120 may schedule uplink transmissions based on the received grant. As an example, a grant 220 may be received in the sub-frame 212 having index 0. In an aspect, a grant 220 may also be received in a previous radio frame 202. The grant 220 may be a joint grant applicable to multiple sub-frames, for example, sub-frames with indices 6-8. The grant 220 may indicate the range of consecutive applicable sub-frames by the start and end values, or may use a bit-map to indicate applicable uplink sub-frames. The grant 220 may further include a HARQ process identifier, for example, 3. The grant 220 may further include resource elements to use for an uplink transmission in each sub-frame. In an aspect, the length of the grant 220 may depend on the number of sub-frames indicated. In an aspect, one or more grant formats may be defined. The format for the grant 220 may be based on the number of uplink sub-frames in the frame structure. In another aspect, the format of the grant may be fixed to handle the worst case scenario having the maximum number of uplink sub-frames in a valid frame structure. The uplink scheduler 120 may determine that the HARQ process identifier included in the grant 220 is applicable to the sub-frame with index 6. The uplink scheduler 120 may increment the HARQ process identifier to determine, for example, that sub-frame index 7 is assigned HARQ process 4, and sub-frame index 8 is assigned HARQ process 5. The uplink scheduler 120 may use a modulus operation based on the number of HARQ processes.

As another example, the UE 110 may receive a second grant 230 in sub-frame index 3. The grant 230 may be an individual grant indicating sub-frame index 8. The grant 230 may further indicate a HARQ process 2, for example, because transmission of HARQ process 2 previously failed and needs to be retransmitted, or HARQ process 2 otherwise includes higher priority data. The grant 230 may also include different resources or a different MCS than the grant 220. The uplink scheduler 120 may select the grant 230 for a transmission in uplink sub-frame index 8 because the grant 230 was received after the grant 220, in other words, the grant 230 is a more recent grant than the grant 220. In an aspect, the grant 230 may also be a joint grant, in which case the uplink scheduler 120 may select the grant 230 for multiple uplink transmissions. In an aspect, the grant 230 may be received a minimum number of sub-frames (e.g., 4 sub-frames) before the uplink sub-frame index 8. If the grant 230 were for an earlier sub-frame that does not meet the minimum number, for example, sub-frame index 6, the uplink scheduler 120 may ignore the grant 230 and/or select the earlier grant 220.

As another example, a UE may be required to monitor two or more uplink scheduling grants in one DL sub-frame. In this case, the two or more uplink scheduling grants may schedule a different set of uplink sub-frames. As an example, a first grant may schedule sub-frames indices 6 and 7, while a second grant may schedule sub-frames indices 8 and 9. As another example, two uplink scheduling grants may be received in sub-frame index 0. The first uplink scheduling grant schedules sub-frames indices 6, 7 and 8, while the second uplink scheduling grant schedules sub-frame index 9.

Figure 3:
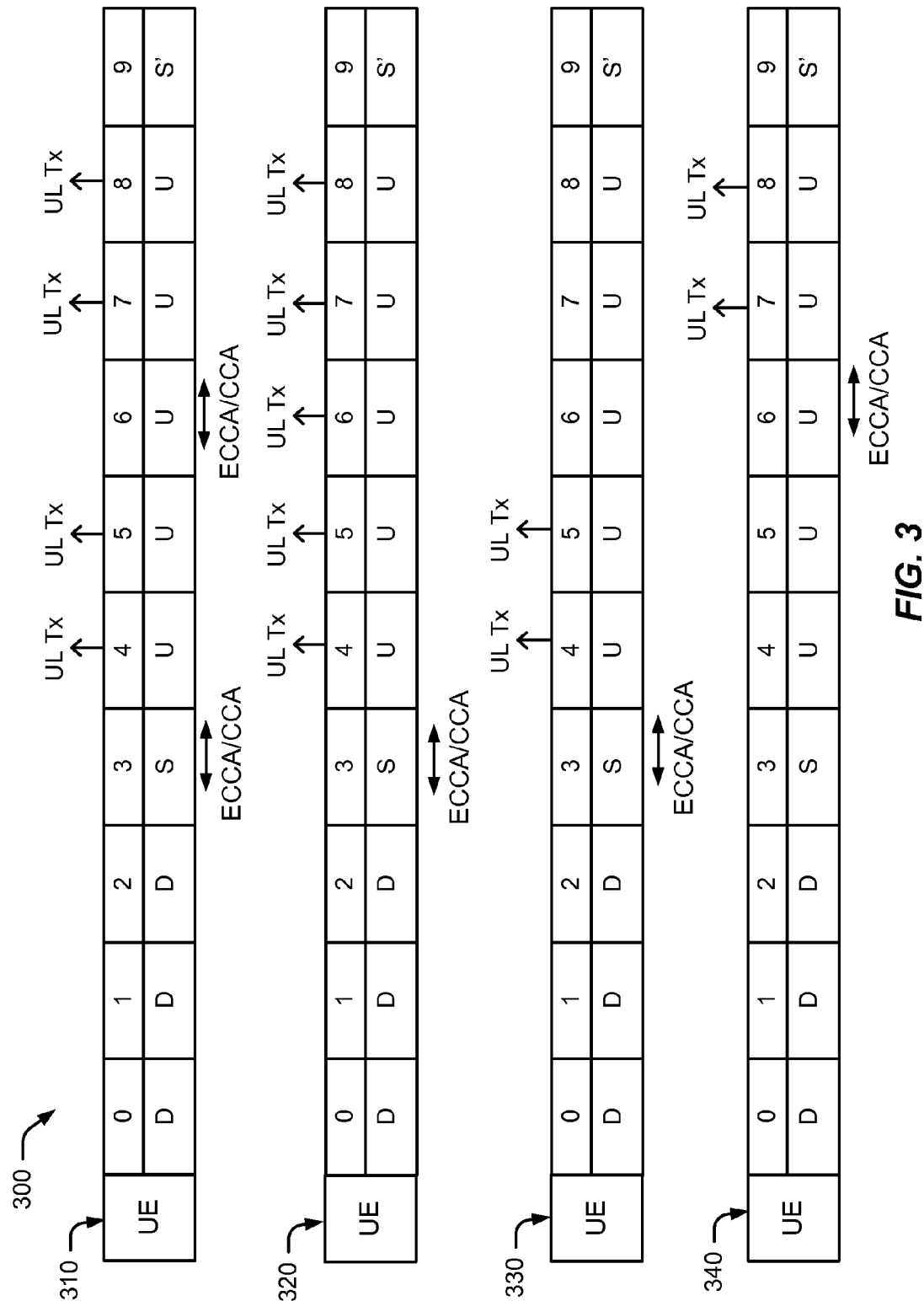
FIG. 3 is a block diagram conceptually illustrating example transmission scheduling.

FIG. 3 is a block diagram 300 conceptually illustrating examples of transmission scheduling. As illustrated, four different UEs 310, 320, 330, 340 may be scheduled during a frame. Each UE may receive one or more uplink scheduling grants indicating which uplink sub-frames to use for transmissions. The frame structure may include three downlink frames in sub-frame indices 0-2, a special sub-frame at index 3, five uplink sub-frames in sub-frame indices 4-8, and a special sub-frame at index 9.

The UE 310 may be scheduled for uplink transmissions during sub-frame indices 4, 5, 7, and 8. The UE 310 may perform an ECCA or CCA procedure during the special sub-frame at index 3. Accordingly, the ECCA or CCA procedure may be performed prior to an uplink transmission in sub-frame index 4. The UE 310 may send uplink transmissions in sub-frame indices 4 and 5. At sub-frame index 6, because the UE 310 does not send an uplink transmission, the UE 310 may perform a second ECCA or CCA procedure to ensure the channel is free for transmission in sub-frame indices 7 and 8. In other words, because the sub-frame index 6, which immediately precedes sub-frame index 7, does not include an uplink transmission, the UE 310 may perform ECCA or CCA in sub-frame index 6 prior to the uplink transmission in sub-frame index 7. Accordingly, a first ECCA or CCA procedure may be performed for sub-frame indices 4 and 5 and a second ECCA or CCA procedure may be performed for subsequent sub-frame indices 7 and 8 within the same frame.

The UE 320 may be scheduled for uplink transmissions during sub-frame indices 4-8. The UE 320 may perform an ECCA or CCA procedure during the special sub-frame at index 3. The UE 320 may then transmit in consecutive sub-frame indices 4-8 without performing another ECCA or CCA procedure.

UE 330 may be scheduled for uplink transmissions during sub-frame indices 4 and 5. The UE 330 may perform an ECCA or CCA procedure during the special sub-frame at index 3. The UE 330 may then transmit in consecutive sub-frame indices 4 and 5 without performing another ECCA or CCA procedure. The UE 330 may power down a transmitter in sub-frame indices 6-8.

UE 340 may be scheduled for uplink transmissions during sub-frame indices 7 and 8. The UE 340 may wait until sub-frame index 6 to perform an ECCA or CCA procedure. The UE 340 may then transmit in consecutive sub-frame indices 7 and 8 without performing another ECCA or CCA procedure.

The scheduling illustrated in FIG. 3 may allow an eNodeB 160 to schedule multiple UEs during the time period covered by a radio frame. The eNodeB may assign different uplink sub-frames to each UE. When multiple UEs are scheduled to transmit during the same uplink sub-frame, the eNodeB 160 may assign different resource elements to each UE. Such flexible assignment provides good load balancing in different sub-frames, which can be flexibly managed by eNodeB 160. From the perspective a UE, an ECCA or CCA procedure may have to be performed one or more times during the duration of uplink sub-frames of a frame.

Figure 4:
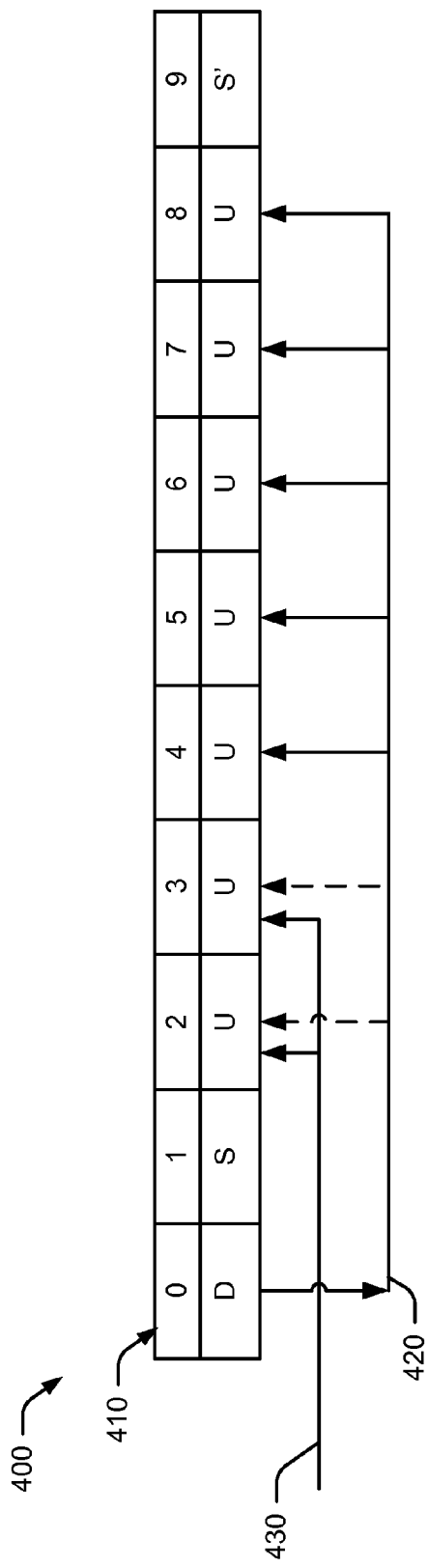
FIG. 4 is a block diagram conceptually illustrating a frame configuration with one downlink sub-frame.

FIG. 4 is a block diagram 400 illustrating a frame 410 having a frame structure including one downlink sub-frame. For example, as illustrated in FIG. 4, the frame 410 may have a single downlink sub-frame at index 0. Accordingly, a UE 110 may only receive uplink scheduling grants in the single sub-frame. One or more grants 420 may be transmitted in the single downlink sub-frame to enable uplink scheduling for sub-frame indices 2-8 (and possibly sub-frame index 9, if it also allows uplink traffic using a portion of the sub-frame). In an aspect, a UE 110 may not support same-frame uplink scheduling under a minimum number of sub-frames. For example, a UE 110 may require a 4 ms or 4 sub-frame delay. Accordingly, for sub-frames that do not meet the minimum delay (e.g. sub-frame indices 2 and 3, the UE 110 may not send an uplink transmission. Alternatively, the UE 110 may use a previously received grant 430 (e.g., from a previous frame) for the uplink sub-frames that do not meet the minimum delay.

Figure 5:
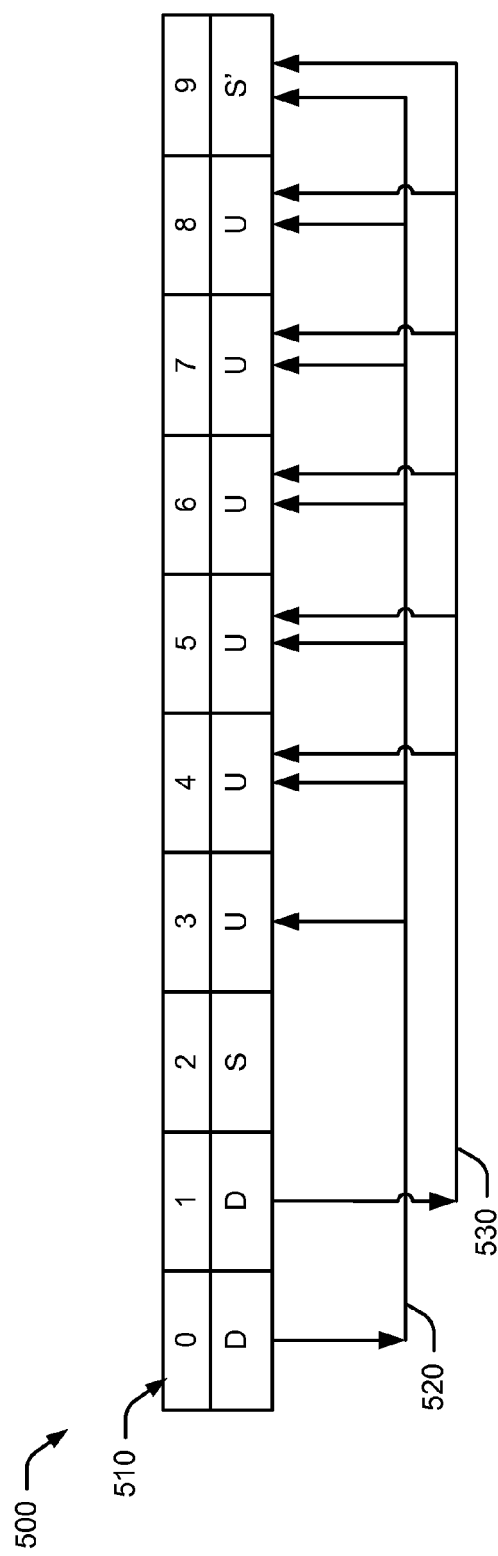
FIG. 5 is a block diagram conceptually illustrating a frame configuration with two downlink sub-frames.

FIG. 5 is a block diagram 500 illustrating a frame 510 having a frame structure including two downlink sub-frames. For example, as illustrated in FIG. 5, the frame 510 may have a two downlink sub-frames at indices 0 and 1. The UE 110 may require, for example, a minimum delay of 3 ms. Accordingly, a first grant 520 received at sub-frame index 0 may be for sub-frame indices 3-9. A second grant 530 may be for sub-frame indices 4-9. In an aspect, an uplink scheduling grant may schedule an uplink transmission during the second special sub-frame at index 9. Sub-frame indices 4-9 may have multiple applicable grants. The UE 110 may determine, for each sub-frame, which of the multiple applicable grants to use for the uplink transmission.

Figure 6:
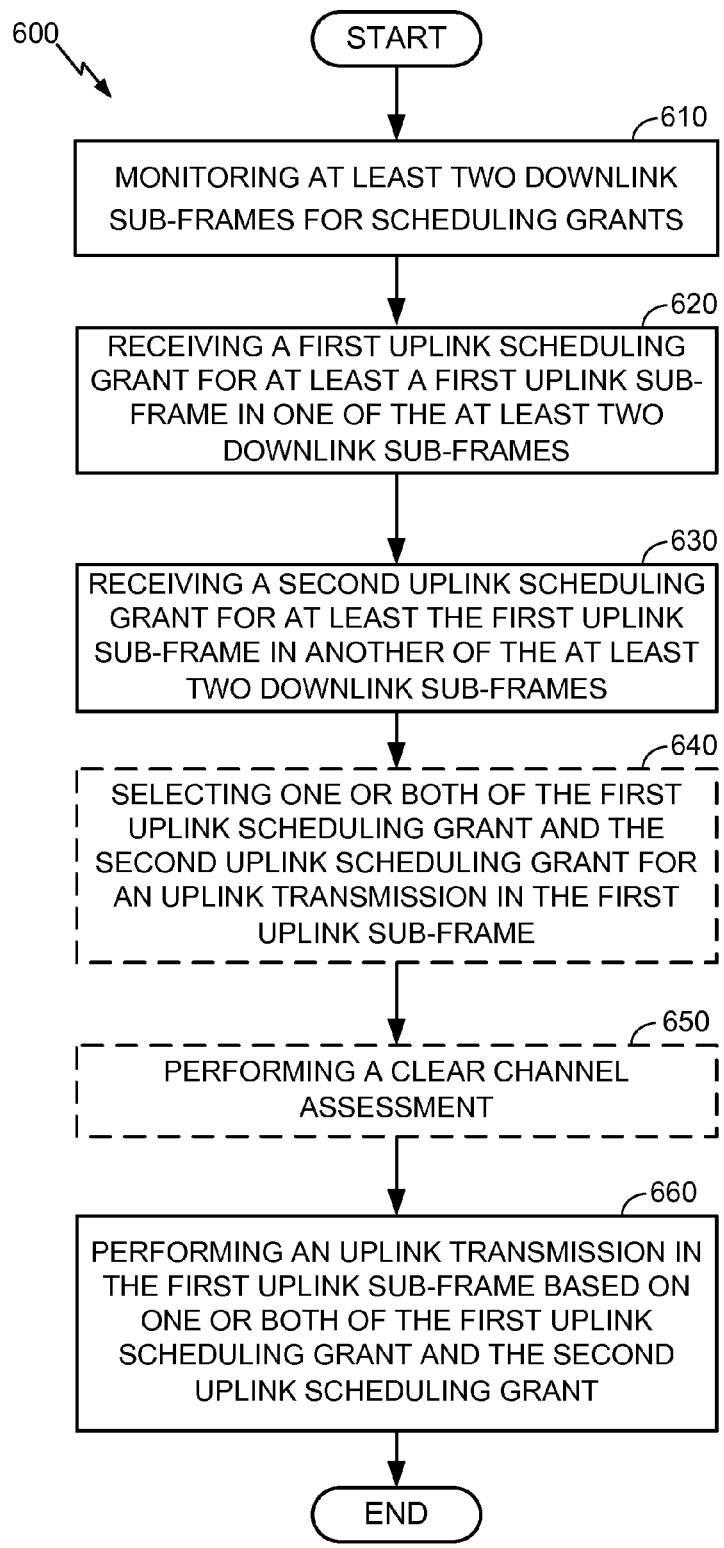
FIG. 6 is a flow diagram illustrating an example method of uplink transmission.

FIG. 6 is a flow diagram illustrating an example method 600 of transmitting scheduled uplink wireless transmissions. The method 600 may be performed by a UE 110.

At block 610, the method 600 may include monitoring at least two downlink sub-frames for scheduling grants. In an aspect, for example, the downlink monitoring component 122 may monitor the at least two downlink sub-frames for scheduling grants. In an aspect, a first downlink sub-frame may be in a first frame and the second downlink sub-frame may be in a second frame that includes an uplink time-slot for the uplink transmission. The downlink monitoring component 122 may monitor one or more carriers for scheduling grants. For example, the downlink monitoring component 122 may monitor for scheduling grants from a first eNodeB 160 on a first carrier and monitor for grants from a second eNodeB (not shown) on a second carrier.

At block 620, the method 600 may include receiving a first uplink scheduling grant for at least a first uplink sub-frame. In an aspect, for example, the grant receiving component 124 may receive the first uplink scheduling grant in one of the at least two downlink sub-frames for at least a first uplink sub-frame. The first uplink scheduling grant may be received in a first sub-frame, which may be in a frame prior to the first uplink-sub frame, or the same frame as the first uplink sub-frame. In an aspect, first uplink scheduling grant may be for a number of sub-frames based on a frame structure defining which sub-frames of a radio frame are available for uplink transmissions. Further, the first uplink scheduling grant may indicate a hybrid acknowledgement repeat request (HARQ) process identifier for the uplink transmission in the first uplink sub-frame. The grant receiving component 124 may further assign a second HARQ process identifier to a second uplink transmission for a second uplink sub-frame indicated by the first uplink scheduling grant based on the HARQ process identifier for the first uplink transmission. For example, the grant receiving component 124 may increment the received HARQ process identifier, or otherwise determine a next HARQ process identifier. In an aspect, for example, the HARQ process ID (e.g., k) for the first uplink sub-frame may be included in the grant 150. The HARQ process ID for each additional uplink sub-frame may be (k+i) mod (N), where N is the number of available HARQ processes and i is the incremental number of each uplink sub-frame associated with the grant 150. In another aspect, the first uplink scheduling grant may indicate a waveform for the uplink transmission. For example, the uplink scheduling grant may indicate whether OFDM or SC-FDM should be used for the uplink transmission. Such indication may be explicit (e.g., 1-bit information field), or implicit. As an example, a higher MCS may be determined to be OFDM while a lower MCS is associated with SC-FDM. As another example, a rank 1 transmission may be associated with SC-FDM while a MIMO transmission may be associated with OFDM.

At block 630, the method 600 may include receiving a second uplink scheduling grant in another of the at least two downlink sub-frames for at least the first uplink sub-frame. In an aspect, for example, the grant receiving component 124 may also receive the second uplink scheduling grant for at least the first uplink sub-frame. The second uplink scheduling grant may be of a same size or a different size than the first uplink scheduling grant. The set of sub-frames to monitor for the second uplink scheduling grant may be the same as or different than the set of sub-frames to monitor the first uplink scheduling grant. The second uplink scheduling grant may be received in a second downlink sub-frame, which may be subsequent to the first downlink sub-frame. The second downlink sub-frame may be in the same frame as the first uplink sub-frame. In an aspect, the second downlink sub-frame may be a minimum number of sub-frames before the first uplink sub-frame. The minimum number of sub-frames may be based on a time to receive and process a scheduling grant, for example 4, 3, 2, or 1 sub-frame, depending on the processing capabilities of the UE 110. In an aspect, the second uplink scheduling grant may be received on a carrier that is different than a carrier on which the first uplink scheduling grant was received. As an example, the second uplink scheduling grant may come from another unlicensed carrier or a licensed carrier.

At block 640, the method 600 may include selecting one or both of the first uplink scheduling grant and the second uplink scheduling grant for an uplink transmission in the first uplink sub-frame. In an aspect, for example, the grant selecting component 126 may select one of the first uplink scheduling grant and the second uplink scheduling grant for an uplink transmission in the first uplink sub-frame. In an aspect, selecting one of the first uplink scheduling grant and the second uplink scheduling grant may include selecting a most recent uplink scheduling grant of the first uplink scheduling grant and the second uplink scheduling grant. In another aspect, selecting one of the first uplink scheduling grant and the second uplink scheduling grant includes selecting an uplink scheduling grant received in a downlink sub-frame at least a minimum number of sub-frames before the first uplink sub-frame.

In block 650, the method 600 may optionally include performing a clear channel assessment before the uplink transmission when no uplink transmission is scheduled in a sub-frame immediately before the first uplink sub-frame. In an aspect, for example, the channel assessing component 129 may perform the clear channel assessment before the uplink transmission when no uplink transmission is scheduled in a sub-frame immediately before the first uplink sub-frame.

In block 660, the method 600 may include performing an uplink transmission in the first uplink sub-frame based on one or both of the first uplink scheduling grant and the second uplink scheduling grant. In an aspect, for example, the transmitting component 128 may performing the uplink transmission in the first uplink sub-frame based on one or both of the first uplink scheduling grant and the second uplink scheduling grant. For example, the transmitting component 128 may generate a transport block from data in an uplink transmission buffer based on the one or more selected uplink scheduling grants. The transmitting component 128 may encode the data based on a selected modulation and coding scheme and a selected waveform. The coded transport block may then be transmitted via an RF transmitter. In an aspect, the uplink transmission may include an indication of the one or more uplink scheduling grants selected.

Figure 7:
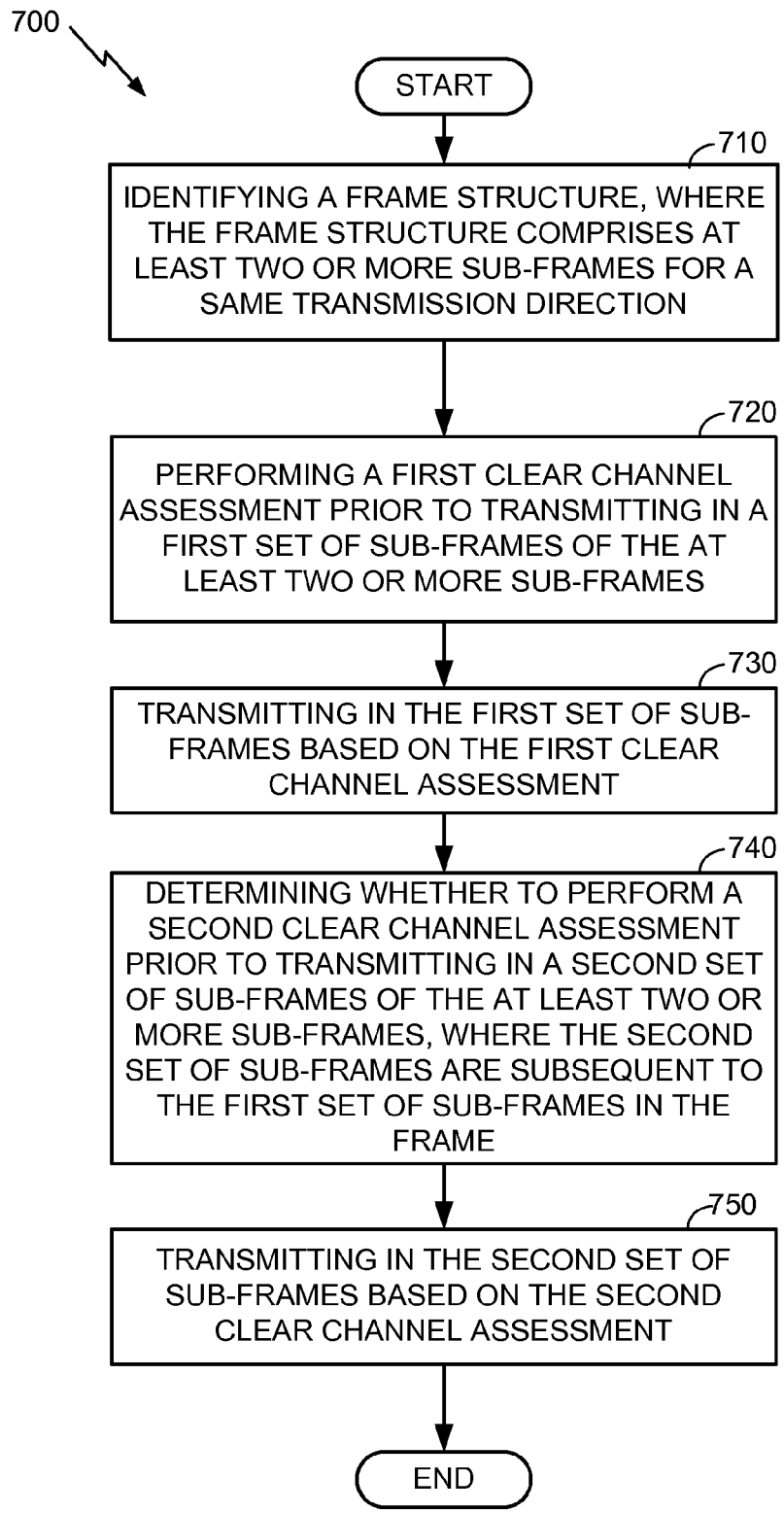
FIG. 7 is a flow diagram illustrating an example method of transmitting scheduled uplink wireless transmissions.

FIG. 7 is a flow diagram illustrating an example method 700 of transmitting scheduled uplink wireless transmissions. The method 700 may be performed by a UE 110 or an eNodeB 160.

At block 710, the method 700 may include identifying a frame structure, where the frame structure includes at least two or more sub-frames for a same transmission direction. In an aspect, for example, the uplink scheduler 120 may identify a frame structure, where the frame structure includes at least two or more sub-frames for a same transmission direction. The transmission direction may be at least one of a downlink or uplink. Note that if a special sub-frame contains a downlink portion which supports downlink control and/or data transmissions, the special sub-frame can be considered as a sub-frame for a downlink transmission direction. Similarly, if a special sub-frame contains an uplink portion which supports uplink control or data transmissions, the special sub-frame can be considered as a sub-frame for an uplink transmission direction. In an aspect, there may at least one sub-frame in between a first set of sub-frames and the second set of sub-frames. For example, the first set of sub-frames may be a set of uplink sub-frames, followed by a special sub-frame, and the second set of sub-frames may be a second set of uplink sub-frames. In an aspect, no uplink transmission may be scheduled in a sub-frame immediately preceding the first uplink sub-frame in the first set of sub-frames (e.g., because the sub-frame immediately preceding the first uplink sub-frame is a downlink sub-frame).

At block 720, the method 700 may include performing a first clear channel assessment prior to transmitting in a first set of sub-frames of the at least two or more sub-frames. In an aspect, for example, the channel assessing component 129 may perform a first clear channel assessment prior to transmitting in a first set of sub-frames of the at least two or more sub-frames. The first set of sub-frames may, for example, include consecutive sub-frames in the uplink direction. The clear channel assessment may at least one of a normal clear channel assessment (CCA) or an extended clear channel assessment (ECCA).

At block 730, the method 700 may include transmitting in the first set of sub-frames based on the first clear channel assessment. In an aspect, for example, the transmitting component 128 may transmit in the first set of sub-frames based on the first clear channel assessment. Note that the actual transmission duration in the first set of sub-frames may be equal to or less than the duration of the first set of sub-frames, depending on the first clear channel assessment. As an example, if the first clear channel assessment is cleared at the beginning of the first set of sub-frames, the transmission may occur during the entire duration of the first set of sub-frames. As another example, if the first clear channel assessment is cleared at beginning of a second sub-frame of the first set of sub-frames, the transmission may occur from the beginning of the second sub-frame to the last sub-frame of the first set of sub-frames. The transmission in the first set of sub-frames may be further based on at least one scheduling grant.

At block 740, the method 700 may include determining whether to perform a second clear channel assessment prior to transmitting in a second set of sub-frames of the at least two or more sub-frames, where the second set of sub-frames are subsequent to the first set of sub-frames in the frame. In an aspect, for example, the channel assessing component 129 may determine whether to perform a second clear channel assessment prior to transmitting in the second set of sub-frames of the at least two or more sub-frames, where the second set of sub-frames are subsequent to the first set of sub-frames in the frame. In an aspect, the determination of whether to perform a second clear channel assessment may based on the frame structure. For example, the channel assessing component 129 may perform a second channel assessment when the frame structure does not include a transmission in a sub-frame immediately preceding the second set of sub-frames. As another example, the channel assessing component 129 may perform a second channel assessment when there is at least one sub-frame for a different direction between the first set of sub-frames and the second set of sub-frames. In another aspect, the determination of whether to perform a second clear channel assessment is based on at least one uplink scheduling grant. For example, the channel assessing component 129 may perform a second channel assessment when another UE is scheduled to transmit between the first set of sub-frames and the second set of sub-frames.

In block 750, the method 700 may include transmitting in the second set of sub-frames based on the second channel assessment. In an aspect, for example, the transmitting component 128 may transmit in the second set of sub-frames based on the second channel assessment. The transmission in the second set of sub-frames may be further based on at least one uplink scheduling grant. The uplink scheduling grant for the second set of sub-frames may be the same as or different from the uplink scheduling grant corresponding to the first set of sub-frames.

Figure 8:
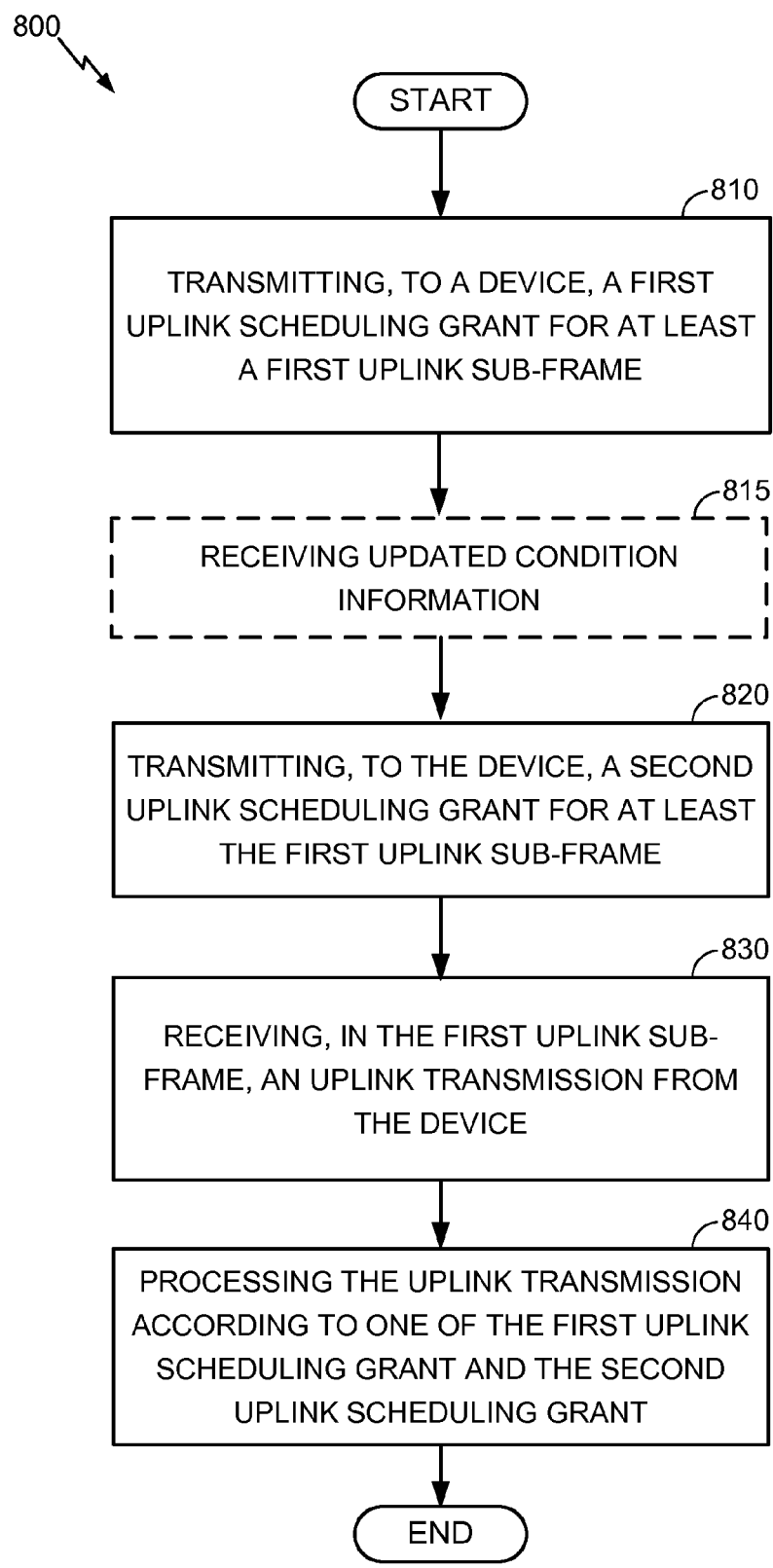
FIG. 8 is a flow diagram illustrating an example method of uplink transmission scheduling.

FIG. 8 is a flow diagram illustrating an example method 800 of scheduling uplink wireless transmissions. The method 800 may be performed by an eNodeB 160.

In block 810, the method 800 may include transmitting, to a device, a first uplink scheduling grant for at least a first uplink sub-frame. In an aspect, for example, the transmitting component 172 may transmit the first uplink scheduling grant for at least a first uplink sub-frame. In an aspect, the device may be the UE 110.

In block 815, the method 800 may optionally include receiving updated condition information. In an aspect, for example, the receiving component 174 may receive the updated condition information. In another aspect, the updated condition information may be received via a network interface from a network node such as another eNodeB or a serving gateway.

In block 820, the method 800 may include transmitting, to the device, a second uplink scheduling grant for at least the first uplink sub-frame. In an aspect, for example, the transmitting component 172 may also transmit, to the UE 110, the second uplink scheduling grant for at least the first uplink sub-frame. In an aspect, the second uplink scheduling grant may indicate a HARQ process identifier for the uplink transmission. The second uplink scheduling grant may also indicate a waveform for the uplink transmission. In an aspect, the first uplink scheduling grant may be transmitted in a first frame and the second uplink scheduling grant may be transmitted in a second frame that includes the first uplink sub-frame. The second uplink scheduling grant may be transmitted at least a minimum number of sub-frames before the uplink transmission.

In block 830, the method 800 may include receiving, in the first uplink sub-frame, an uplink transmission from the device. In an aspect, for example, the receiving component 174 may receive, in the first uplink sub-frame, the uplink transmission from the device, which may be the UE 110. In an aspect, the uplink transmission may include an indication of an uplink scheduling grant selected by the device.

In block 840, the method 800 may include processing the uplink transmission according to one of the first uplink scheduling grant and the second uplink scheduling grant. In an aspect, for example, the decoding component 176 may process the uplink transmission according to one of the first uplink scheduling grant and the second uplink scheduling grant. If the uplink transmission includes an indication of an uplink scheduling grant selected by the device, the decoding component 176 may process the uplink transmission according to the selected uplink scheduling grant.

Figure 9:
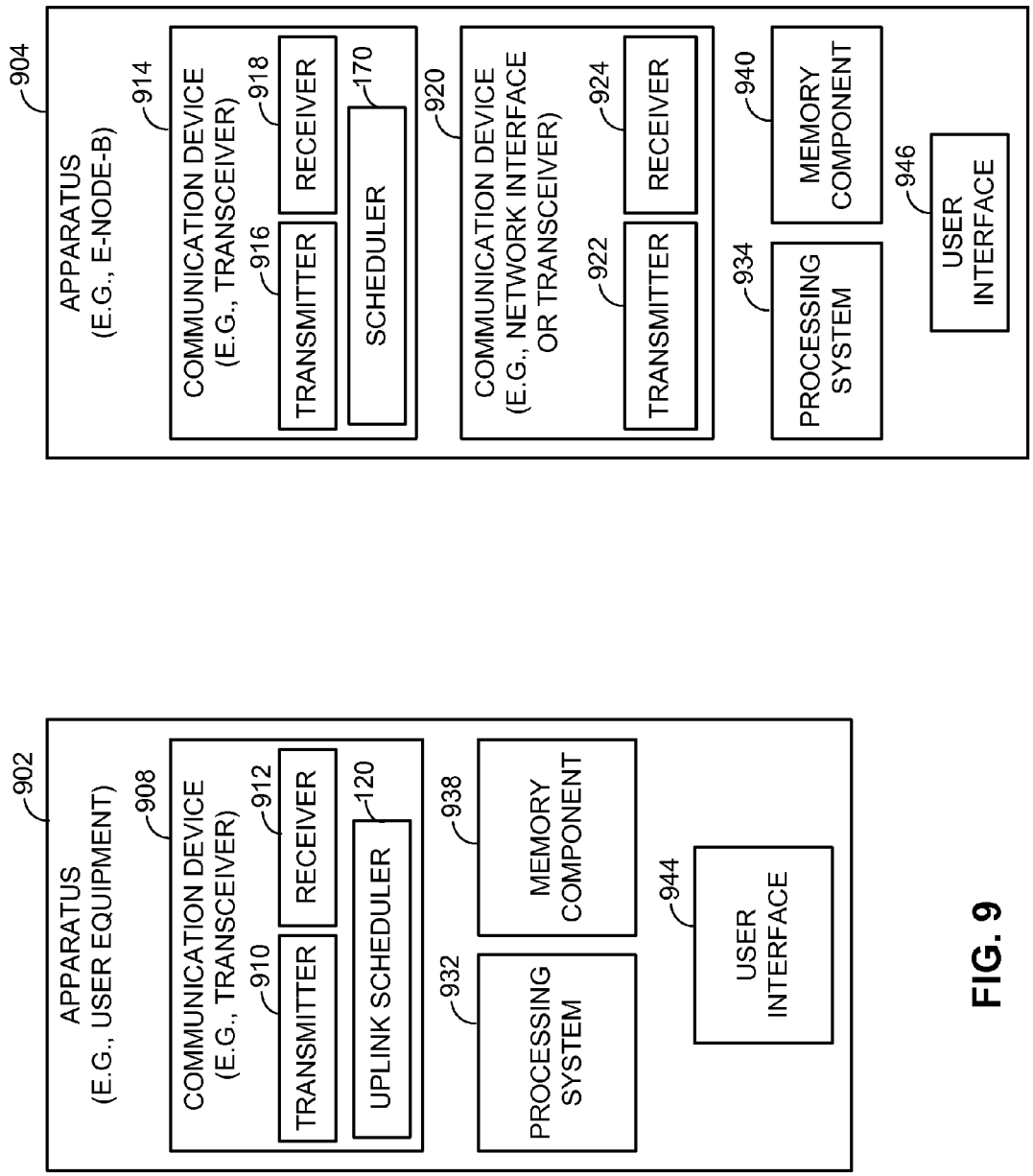
FIG. 9 is a simplified block diagram of several sample aspects of components that may be employed in communication nodes.

FIG. 9 illustrates several sample components (represented by corresponding blocks) that may be incorporated into an apparatus 902 and an apparatus 904 (e.g., corresponding to a UE 110 and an eNodeB 160, respectively) to support uplink scheduling operations as taught herein. The apparatus 902 and the apparatus 904, for example, may include an uplink scheduler 120 and scheduler 170, respectively, for scheduling uplink transmissions of UE 110. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 902 and the apparatus 904 each include at least one wireless communication device (represented by the communication devices 908 and 914 (and the communication device 920 if the apparatus 904 is a relay)) for communicating with other nodes via at least one designated radio access technology. Each communication device 908 includes at least one transmitter (represented by the transmitter 910) for transmitting and encoding signals (e.g., messages, indications, information, and so on) and at least one receiver (represented by the receiver 912) for receiving and decoding signals (e.g., messages, indications, information, pilots, and so on). Similarly, each communication device 914 includes at least one transmitter (represented by the transmitter 916) for transmitting signals (e.g., messages, indications, information, pilots, and so on) and at least one receiver (represented by the receiver 918) for receiving signals (e.g., messages, indications, information, and so on). If the apparatus 904 is a relay access point, each communication device 920 may include at least one transmitter (represented by the transmitter 922) for transmitting signals (e.g., messages, indications, information, pilots, and so on) and at least one receiver (represented by the receiver 924) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 904 comprises a network listen module.

The apparatuses 902, 904, also include other components that may be used in conjunction with uplink scheduling operations as taught herein. The apparatus 902 includes a processing system 932 for providing functionality relating to, for example, communicating with an eNodeB to support uplink scheduling as taught herein and for providing other processing functionality. The apparatus 904 includes a processing system 934 for providing functionality relating to, for example, uplink scheduling as taught herein and for providing other processing functionality. The apparatuses 902, and 904, include memory devices 938, and 940 (e.g., each including a memory device), respectively, for maintaining information (e.g., information indicative of reserved resources, thresholds, parameters, and so on). In addition, the apparatuses 902, 904, and 906 include user interface devices 944 and 948 respectively, for providing indications (e.g., audible and/or visual indications) to a user and/or for receiving user input (e.g., upon user actuation of a sensing device such a keypad, a touch screen, a microphone, and so on).

For convenience, the apparatus 902 is shown in FIG. 9 as including components that may be used in the various examples described herein. In practice, the illustrated blocks may have different functionality in different aspects.

The components of FIG. 9 may be implemented in various ways. In some implementations, the components of FIG. 9 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 908, 932, 938, and 944 may be implemented by processor and memory component(s) of the apparatus 902 (e.g., by execution of appropriate code and/or by appropriate configuration of processor components). Similarly, some or all of the functionality represented by blocks 914, 920, 934, 940, and 946 may be implemented by processor and memory component(s) of the apparatus 904 (e.g., by execution of appropriate code and/or by appropriate configuration of processor components).

Some of the eNodeBs referred to herein may comprise low-power eNodeBs or low power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min$ {$N_T$, $N_R$}. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
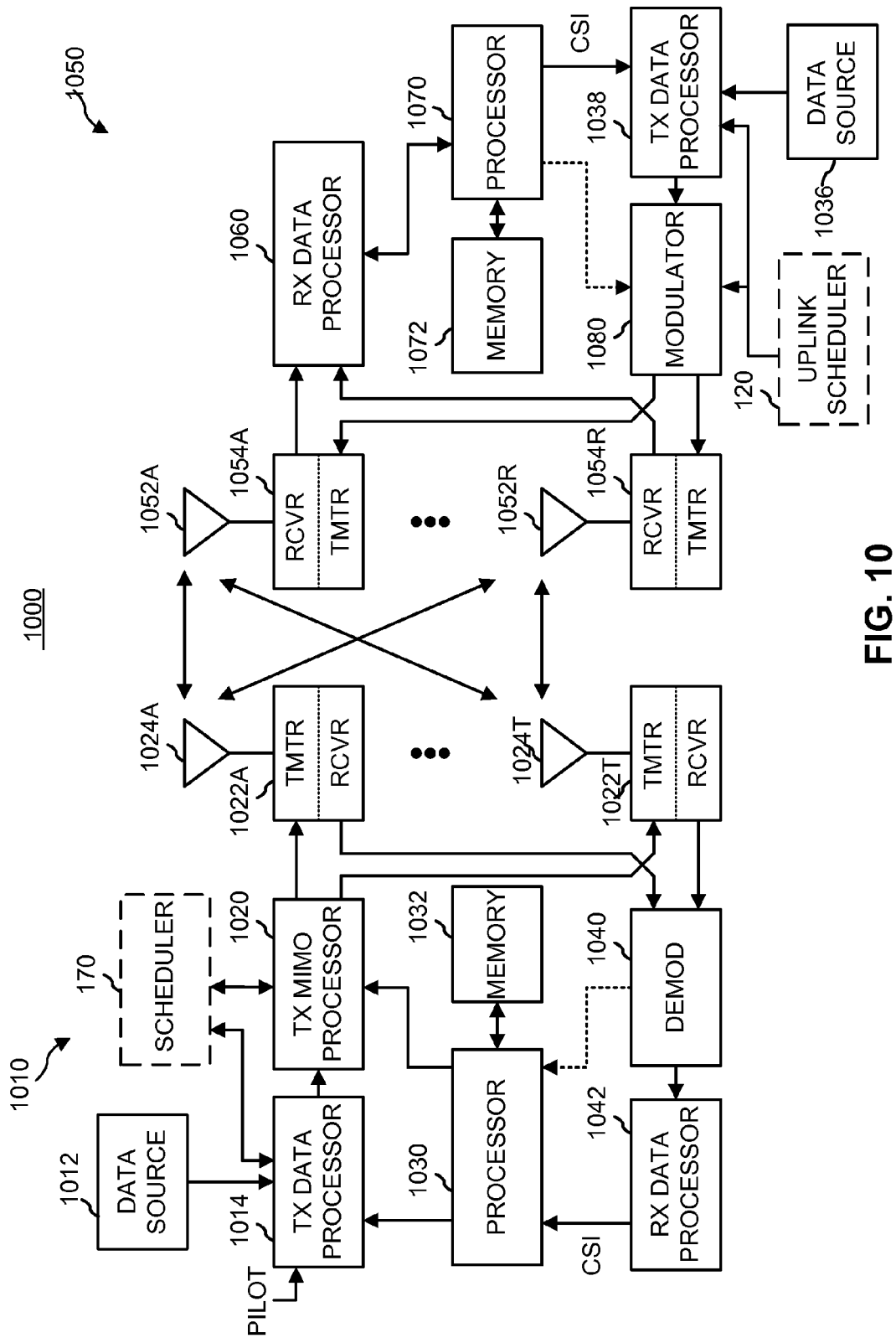
FIG. 10 is a simplified block diagram of several sample aspects of communication components.

FIG. 10 illustrates in more detail the components of a wireless device 1010 (e.g., an eNodeB 160) and a wireless device 1050 (e.g., a UE 110) of a sample communication system 1000 that may be adapted as described herein. For example, wireless device 1010 may include a scheduler 170 and wireless device 1050 may include an uplink scheduler 120 for scheduling uplink transmissions. The scheduler 170 may be a separate component or may be implemented by components such as TX data processor 1014 and TX MIMO processor 1020 of wireless device 1010. The uplink scheduler 120 may be implemented by TX data processor 1038 of wireless device 1050. At the device 1010, traffic data for a number of data streams is provided from a data source 1012 to a transmit (TX) data processor 1014. Each data stream may then be transmitted over a respective transmit antenna. The scheduler 170 (FIG. 1) may be implemented by the TX data processor 1014.

The TX data processor 1014 formats, codes, and interleaves the traffic data for each data stream based on a particular coding scheme selected for that data stream to provide coded data. In an aspect, the traffic data may include uplink scheduling grants for the wireless device 1050. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides NT modulation symbol streams to NT transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1022A through 1022T are then transmitted from NT antennas 1024A through 1024T, respectively.

At the wireless device 1050, the transmitted modulated signals are received by NR antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the NR received symbol streams from NR transceivers 1054 based on a particular receiver processing technique to provide NT "detected" symbol streams. The RX data processor 1060 then demodulates, deinterleaves, and decodes each detected symbol stream to recover the traffic data for the data stream. In an aspect, the traffic data may include the uplink scheduling grants 150 (FIG. 1). The processing by the RX data processor 1060 is complementary to that performed by the TX MIMO processor 1020 and the TX data processor 1014 at the device 1010.

The uplink scheduler 120 may determine, for each subframe, whether the received uplink scheduling grants 150 allow a transmission and a modulation and coding scheme and waveform to use for the transmission. A processor 1070 periodically determines which pre-coding matrix to use. The processor 1070 formulates a reverse link message comprising a matrix index portion and a rank value portion. A data memory 1072 may store program code, data, and other information used by the processor 1070 or other components of the wireless device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R based on the uplink scheduling grants 150, and transmitted back to the device 1010.

At the device 1010, the modulated signals from the wireless device 1050 are received by the antennas 1024, conditioned by the transceivers 1022, demodulated by a demodulator (DEMOD) 1040, and processed by a RX data processor 1042 to extract the reverse link message transmitted by the wireless device 1050. The processor 1030 then determines which pre-coding matrix to use for determining the beam-forming weights then processes the extracted message.

It will be appreciated that for each wireless device 1010 and 1050 the functionality of two or more of the described components may be provided by a single component. It will be also be appreciated that the various communication components illustrated in FIG. 10 and described above may be further configured as appropriate to perform communication adaptation as taught herein. For example, the processors 1030/1070 may cooperate with the memories 1032/1072 and/or other components of the respective devices 1010/1050 to perform the communication adaptation as taught herein. In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for transmitting scheduled uplink wireless transmissions, the method comprising:
    monitoring at least two downlink sub-frames for uplink scheduling grants;
    receiving a first uplink scheduling grant in one of the at least two downlink sub-frames for at least a first uplink sub-frame, wherein the first uplink scheduling grant is for multiple uplink sub-frames including the first uplink sub-frame;
    receiving a second uplink scheduling grant in another of the at least two downlink sub-frames for at least the first uplink sub-frame; and
    performing an uplink transmission in the first uplink sub-frame and at least one uplink sub-frame consecutive to the first uplink sub-frame based on one or both of the first uplink scheduling grant and the second uplink scheduling grant.

2. The method of claim 1, wherein performing the uplink transmission in the first uplink sub-frame and at least one uplink sub-frame consecutive to the first uplink sub-frame based on at least one of the first uplink scheduling grant and the second uplink scheduling grant includes selecting a most recent uplink scheduling grant of the first uplink scheduling grant and the second uplink scheduling grant.

3. The method of claim 1, wherein performing the uplink transmission in the first uplink sub-frame and at least one uplink sub-frame consecutive to the first uplink sub-frame based on at least one of the first uplink scheduling grant and the second uplink scheduling grant includes selecting an uplink scheduling grant received in a downlink sub-frame at least a minimum number of sub-frames before the first uplink sub-frame.

4. The method of claim 1, wherein a number of the multiple uplink sub-frames of the first uplink scheduling grant is based on a frame structure defining which sub-frames of a radio frame are available for uplink transmissions.

5. The method of claim 1, wherein the first uplink scheduling grant indicates a hybrid acknowledgement repeat request (HARQ) process identifier for the uplink transmission in the first uplink sub-frame.

6. The method of claim 5, further comprising assigning a second HARQ process identifier to a second uplink transmission in a second uplink sub-frame based on the indicated HARQ process identifier for the uplink transmission in the first uplink sub-frame, wherein the first uplink scheduling grant is also for the second uplink sub-frame, and wherein the second uplink sub-frame is subsequent to the first uplink sub-frame.

7. The method of claim 1, wherein the second uplink scheduling grant is for a single uplink sub-frame in a frame.

8. The method of claim 1, wherein the first uplink scheduling grant indicates a waveform for the uplink transmission.

9. The method of claim 1, wherein receiving the first uplink scheduling grant comprises receiving the first uplink scheduling grant on a first carrier and receiving the second uplink scheduling grant comprises receiving the second uplink scheduling grant on a second carrier.

10. The method of claim 1, wherein receiving the first uplink scheduling grant comprises receiving the first uplink scheduling grant in a first frame and receiving the second uplink scheduling grant comprises receiving the second uplink scheduling grant in a subsequent second frame that includes the first uplink sub-frame.

11. The method of claim 1, wherein the uplink transmission includes an indication of the at least one of the first uplink scheduling grant and the second uplink scheduling grant used for the uplink transmission.

12. The method of claim 1, further comprising performing a clear channel assessment prior to the uplink transmission when no uplink transmission is scheduled in a sub-frame immediately preceding the first uplink sub-frame.

13. The method of claim 12, further comprising determining whether to perform a second clear channel assessment prior to a second uplink transmission in a second uplink sub-frame, wherein at least one of the first uplink scheduling grant and the second uplink scheduling grant is also for the second uplink sub-frame, and wherein the second uplink sub-frame is subsequent to the first uplink sub-frame within a same frame.

14. An apparatus for transmitting scheduled uplink wireless transmissions, the apparatus comprising:
    means for monitoring at least two downlink sub-frames for scheduling grants;
    means for receiving a first uplink scheduling grant in one of the at least two downlink sub-frames for at least a first uplink sub-frame, wherein the first uplink scheduling grant is for multiple uplink sub-frames including the first uplink sub-frame;
    means for receiving a second uplink scheduling grant in another of the at least two downlink sub-frames for at least the first uplink sub-frame; and
    means for performing an uplink transmission in the first uplink sub-frame and at least one uplink sub-frame consecutive to the first uplink sub-frame based on one or both of the first uplink scheduling grant and the second uplink scheduling grant.

15. The apparatus of claim 14, further comprising means for selecting a most recent uplink scheduling grant of the first uplink scheduling grant and the second uplink scheduling grant for the uplink transmission.

16. The apparatus of claim 14, further comprising means for selecting an uplink scheduling grant received in a downlink sub-frame at least a minimum number of sub-frames before the first uplink sub-frame for the uplink transmission.

17. The apparatus of claim 14, wherein the first uplink scheduling grant indicates a hybrid acknowledgement repeat request (HARQ) process identifier for the uplink transmission.

18. The apparatus of claim 17, further comprising means for assigning a second HARQ process identifier to a second uplink transmission for a second uplink sub-frame based on the indicated HARQ process identifier for the uplink transmission in the first uplink sub-frame, wherein the first uplink scheduling grant is also for the second uplink sub-frame, and wherein the second uplink sub-frame is subsequent to the first uplink sub-frame.

19. The apparatus of claim 14, wherein the means for receiving is configured to receive the first uplink scheduling grant on a first carrier and receive the second uplink scheduling grant on a second carrier.

20. The apparatus of claim 14, further comprising means for performing a clear channel assessment before the uplink transmission when no uplink transmission is scheduled in a sub-frame immediately before the first uplink sub-frame.

21. An apparatus for transmitting scheduled uplink wireless transmissions, the apparatus comprising:
    a transceiver configured to receive scheduling grants in one or more downlink sub-frames and transmit data in one or more uplink sub-frames;
    a memory; and
    a processor communicatively coupled to the transceiver and the memory, the processor and the memory configured to:
    monitor, via the transceiver, at least two of the one or more downlink sub-frames for the scheduling grants;
    receive a first uplink scheduling grant in one of the at least two downlink sub-frames for at least a first uplink sub-frame of the one or more uplink sub-frames, wherein the first uplink scheduling grant is for multiple uplink sub-frames including the first uplink sub-frame;
    receive a second uplink scheduling grant in another of the at least two downlink sub-frames for at least the first uplink sub-frame; and
    perform an uplink transmission in the first uplink sub-frame and at least one uplink sub-frame consecutive to the first uplink sub-frame based on one or both of the first uplink scheduling grant and the second uplink scheduling grant.

22. The apparatus of claim 21, wherein the processor and memory are configured to select a most recent uplink scheduling grant of the first uplink scheduling grant and the second uplink scheduling grant for the uplink transmission.

23. The apparatus of claim 21, wherein the processor and memory are configured to select an uplink scheduling grant received in a downlink sub-frame at least a minimum number of sub-frames before the first uplink sub-frame for the uplink transmission.

24. The apparatus of claim 21, wherein the first uplink scheduling grant indicates a hybrid acknowledgement repeat request (HARQ) process identifier for the uplink transmission.

25. The apparatus of claim 24, wherein the processor and memory are configured to assign a second HARQ process identifier to a second uplink transmission for a second uplink sub-frame based on the indicated HARQ process identifier for the uplink transmission in the first uplink sub-frame, wherein the first uplink scheduling grant is also for the second uplink sub-frame, and wherein the second, uplink sub-frame is subsequent to the first uplink sub-frame.

26. The apparatus of claim 21, wherein the processor and memory are configured to perform a clear channel assessment before the uplink transmission when no uplink transmission is scheduled in a sub-frame immediately before the first uplink sub-frame.

27. A computer-readable medium storing computer executable code for transmitting scheduled uplink wireless transmissions, comprising:
    code for monitoring at least two downlink sub-frames for scheduling grants;
    code for receiving a first uplink scheduling grant in one of the at least two downlink sub-frames for at least a first uplink sub-frame, wherein the first uplink scheduling grant is for multiple uplink sub-frames including the first uplink sub-frame;
    code for receiving a second uplink scheduling grant in another of the at least two downlink sub-frames for at least the first uplink sub-frame; and
    code for performing an uplink transmission in the first uplink sub-frame and at least one uplink sub-frame consecutive to the first uplink sub-frame based on one or both of the first uplink scheduling grant and the second uplink scheduling grant.

28. The computer-readable medium of claim 27, further comprising code for selecting a most recent uplink scheduling grant of the first uplink scheduling grant and the second uplink scheduling grant for the uplink transmission.

29. The computer-readable medium of claim 27, further comprising code for selecting an uplink scheduling grant received in a downlink sub-frame at least a minimum number of sub-frames before the first uplink sub-frame for the uplink transmission.

30. The computer-readable medium of claim 27, further comprising code for performing a clear channel assessment before the uplink transmission when no uplink transmission is scheduled in a sub-frame on the first carrier immediately before the first uplink sub-frame.

* * * * *